Jan. 2, 1934.  E. W. N. BOOSEY  1,941,537
SEEPAGE JOINT
Filed Dec. 17, 1930
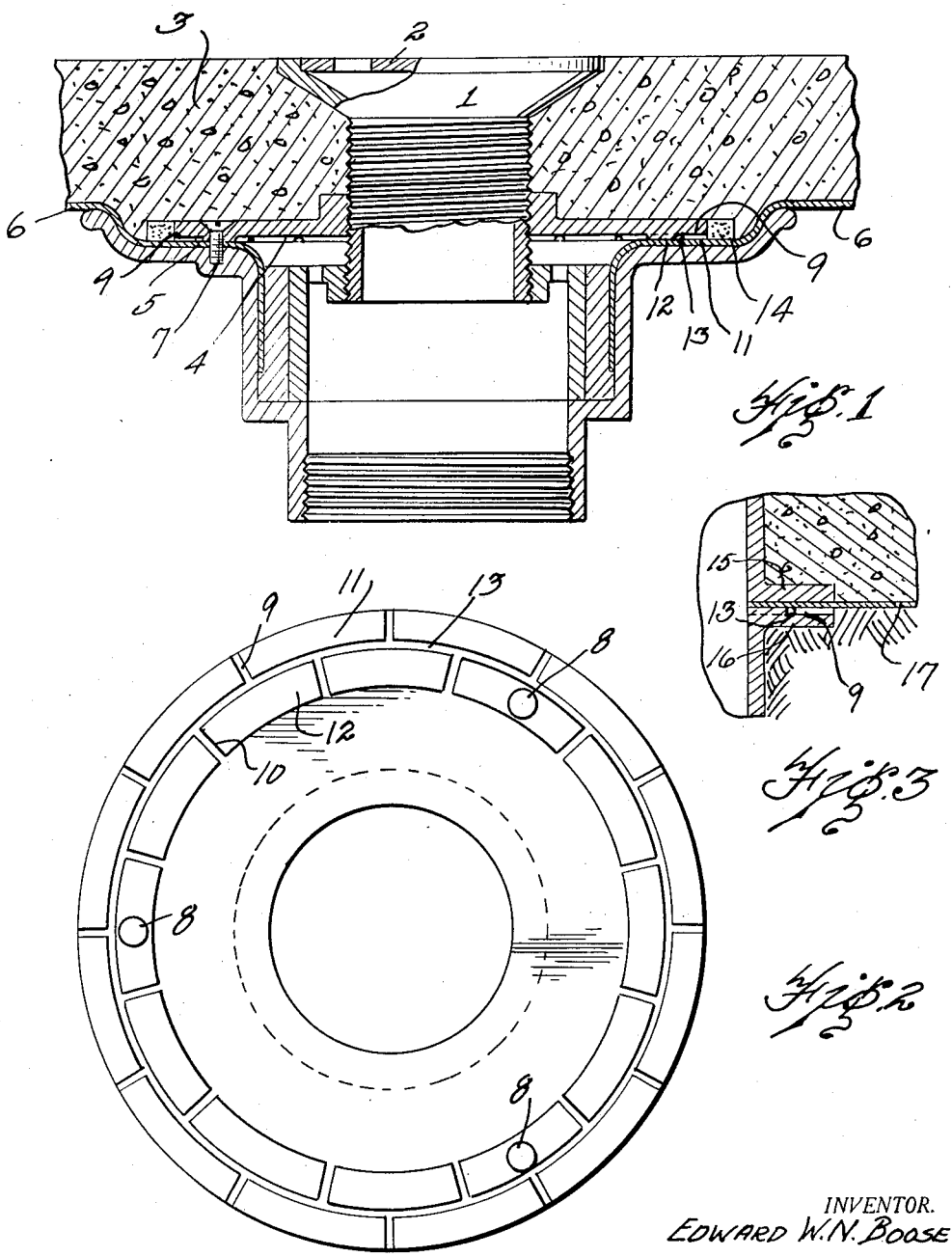
INVENTOR.
EDWARD W. N. BOOSEY
BY
ATTORNEY.

Patented Jan. 2, 1934

1,941,537

UNITED STATES PATENT OFFICE 1,941,537

SEEPAGE JOINT

Edward W. N. Boosey, Detroit, Mich.

Application December 17, 1930
Serial No. 503,055

3 Claims. (Cl. 285—37)

This invention relates to seepage joints used with plumbing fittings or fixtures, portions of which are embedded in floors, concrete, or masonry structure and by means of which water or fluids tending to seep through the floor are directed to the plumbing fitting to discharge thereinto. Such joints have heretofore been made with radial grooves formed in the body of one part to contact and clamp a lead pan or apron between the grooved element and another element of the fitting as for instance as shown in my Patent No. 1,482,216.

In the provision of such joints, especially where heated fluids are discharged through the drainage fitting, the lead is caused to expand and does not contract to its original position and in such radially grooved element the expansion is into the groove and provides an opening from the interior of the fitting below the pan into the floor. Thus such previous constructions after a number of years of use have become inefficient in operation. My present invention seeks to avoid this difficulty and to provide a joint in which channels are provided for seepage water or fluid and of such arrangement and construction that the expansion of the lead pan does not provide a passageway from the interior to the exterior of the fitting.

These general objects of the invention and the several novel features thereof are hereinafter more fully described and claimed, and the preferred form of construction of a seepage joint embodying my invention is shown in the accompanying drawing in which—

Fig. 1 is a sectional view of a floor drain showing my improved seepage joint.

Fig. 2 is a plan view of the plate provided with the channels for the seepage water.

Fig. 3 is a detail of an alternative form of construction.

The floor drain shown in Fig. 1 is only one form of fitting with which my improved seepage joint may be utilized, and it is to be understood that the invention is not confined to any specific construction or type of plumbing fixture as, conveniently, it may be employed between two joints of a waste stack or any other character of plumbing installation with which it is desired to utilize a lead pan to direct seepage fluid into the interior of the fitting to discharge to the waste conduit.

In the floor drain shown, there is a head 1 having a grating 2 at the surface of the floor 3 and to a threaded portion of this head is secured a flange 4 extending laterally therefrom and in opposed relation with a flange 5 of a lower portion of the structure.

It also is to be understood that the flange 4 may be of any desired form or even integral with the fitting but in any event the flange 4 should be so constructed or arranged as to be brought into tight contact with the lead pan 6 which extends outwardly into the floor and terminates in a central aperture, the peripheral portion of the pan about the aperture being clamped between the flanges 4 and 5. In this instance of construction the parts are clamped by means of screws 7, of which there may be three as indicated by the apertures 8 of Fig. 2. The flange 4 has on its under surface, as shown in plan view in Fig. 2, a series of short radial grooves 9 and 10 and raised portions 11 and 12, the exterior raised portions 11 being separated from the interior raised portions 12 by a peripheral groove 13, and it is to be understood that the grooves 9 are in staggered relation with the grooves 10 and that the raised portions 11 and 12 are finished to an even surface to contact the upper surface of the lead pan in the construction shown. Thus, this lead pan is forcibly held in contact with the upper surface of the floor flange 5 by each of these raised portions and thus clamping the pan, any expansion thereof due to the heated fluid passing through the drain, does not provide a passageway for fluid to pass from the interior to the exterior of the fitting beneath the pan but, nevertheless, seepage water gathering on the pan and flowing toward the fitting may enter the radial groove 9, pass into the circumferential groove 11 and through the radial groove 10 to the interior of the fitting.

By this arrangement the liability of the expansion of the lead pan to form a passageway for fluid from the interior to the exterior underneath the lead pan is avoided. It will be observed at the right side of Fig. 1, that the outer raised section 11 flatly engages the surface of the lead pan while the inner raised section 12 likewise engages the pan at a point directly opposite the groove 9 between the raised sections 11 of the outer series. It is further to be noted that, while the grooved flange is here shown as circular in form, it may take any form desired or as may be required by the various characters and types of fittings in which a seepage joint is necessary or desirable. In the construction shown, a seepage ring 14 lies about the periphery of the flange 4 and covers the ends of the grooves 9 to prevent concrete or refuse material working into these grooves during the construction period.

I have shown in the drawing, that the upper member and upper surface of the pan are engaged by the grooved element. There are cases of installations where this grooved element should be on the member or flange engaging the under surface of the pan, such for instance as in basements where the hydrostatic head of the ground water outside of the building is higher than the basement floor installation which tends to force the water upwardly.

In such case, the lead pan directs water under pressure on the under side of the pan into the fitting. Such an arrangement is illustrated in Fig. 3 in which merely the two flanges 15 and 16 of two parts of a plumbing installation and pan 17 are shown which may be flanges of any character of plumbing fitting usually floor drains that may be placed in basement floors. The invention therefore is not confined to the use of a grooved element on the upper surface of the pan.

It is to be understood that while I have shown staggered plane surfaces of considerable area in spaced relation to provide grooves, it is to be understood that these surfaces or contacting areas may be of any size, the essential feature being in the arrangement thereof to contact the lead plate and hold it from expansion opposite the inlet or outlet end of the spaces or grooves provided by the staggered relationship thereof.

From the foregoing description it is believed evident that the various objects of the invention are attained by the construction described.

Having thus briefly described my invention, its construction and utility, what I claim and desire to secure by Letters Patent of the United States is—

1. In a plumbing element, a seepage joint between parts thereof including a soft metal pan or apron clamped between the parts which comprises two series of spaced raised portions on one of the parts, the raised portions of each series being opposite the spaces between the respective other series and the two series being in the spaced relation whereby indirect passageways are provided from the exterior to the interior of the fitting and the soft metal pan is clamped to the other element at points respectively opposite the spaces extending to the interior and to the exterior of the element.

2. In a plumbing element, a seepage joint between parts thereof including a soft metal pan or apron clamped between the parts, which consists of a series of spaced raised portions on one of the said elements contacting the lead member, the said contacting portions being in staggered relationship providing indirect passageways from the exterior and the interior of the fitting and provide means to hold the soft metal pan from expansion in a manner to form passageways for fluid between the other element and the pan leading from the interior to the exterior of the plumbing element.

3. In a plumbing fitting, a seepage joint between upper and lower hollow portions thereof comprising an apertured apron, said portions each having a lateral flange between which the apron is positioned with the opening thereof in registration with the openings through the said hollow portions, means for securing the flanges together in binding engagement with the apron, the lower surface of the flange of the upper portion having grooves providing passageways for fluid, there being an opening provided in the fitting through which fluid from the said passageways may discharge into the fitting, the said grooves having an inner end section offset relative to an outer end section whereby the apron is held in contact with both flanges opposite the offset portions of the grooves.

EDWARD W. N. BOOSEY.